(12) United States Patent
Mende et al.

(10) Patent No.: US 6,821,609 B2
(45) Date of Patent: Nov. 23, 2004

(54) EXTRUSION DIE FOR MAKING HOLLOW-CHAMBER PROFILED PANELS OF THERMOPLASTIC PLASTIC WITH INTERIOR COEXTRUDED LAYER

(75) Inventors: Volker Mende, Darmstadt (DE); Wolfgang Scharnke, Darmstadt (DE)

(73) Assignee: Roehm GmbH & Co., KG, Darmstadt (DE)

( * ) Notice: Subject to any disclaimer, the term of this patent is extended or adjusted under 35 U.S.C. 154(b) by 20 days.

(21) Appl. No.: 10/153,672

(22) Filed: May 24, 2002

(65) Prior Publication Data

US 2002/0197449 A1 Dec. 26, 2002

(30) Foreign Application Priority Data

Jun. 22, 2001 (DE) .......................................... 101 29 702

(51) Int. Cl.$^7$ .............................. B32B 1/00; B32B 3/12
(52) U.S. Cl. ....................... 428/178; 428/120; 428/188; 425/113; 425/382 R; 425/461; 264/177.16; 264/209.1; 264/209.8; 52/793.1
(58) Field of Search ................................. 428/178, 185, 428/119, 120; 52/791.1, 90.1, 793.1, 421; 264/176.1, 177.1, 177.16, 209.1, 209.8, 241; 425/308, 328, 381, 382.2, 382 R, 376.1, 113, 461, 325; 249/187.1

(56) References Cited

U.S. PATENT DOCUMENTS

| 4,113,411 | A | | 9/1978 | Terragni | |
|---|---|---|---|---|---|
| 4,443,987 | A | * | 4/1984 | Erb | .............................. 428/34 |
| 4,513,048 | A | * | 4/1985 | Kaube et al. ............... | 428/188 |

(List continued on next page.)

FOREIGN PATENT DOCUMENTS

| DE | 25 44 245 | 4/1977 |
|---|---|---|
| DE | 35 28 165 | 2/1987 |
| DE | 37 41 793 | 7/1989 |
| DE | 196 18 569 | 11/1997 |
| DE | 197 29 093 | 11/1998 |

(List continued on next page.)

OTHER PUBLICATIONS

U.S. patent application Ser. No. 10/139,385, Scharnke et al., filed May 7, 2002.
U.S. patent application Ser. No. 08/329,075, Volker et al., filed Oct. 25, 1994.
U.S. patent application Ser. No. 10/153,672, Mende et al., filed May 24, 2002.

Primary Examiner—Donald J. Loney
(74) Attorney, Agent, or Firm—Oblon, Spivak, McClelland, Maier & Neustadt, P.C.

(57) ABSTRACT

An extrusion die has a distributing tool; a profiling nozzle; and at least three melt-flow ducts; a first melt-flow duct is routed around a second melt-flow duct or the distributing tool using a branch and is merged again downstream from the branch; and a third melt-flow duct opens into the second melt-flow duct. The extrusion die is suitable for extrusion of a hollow-chamber profiled panel of a thermoplastic plastic with a layered structure which comprises a top and bottom layer of a first plastic melt; and an intermediate layer of a second plastic melt disposed in an interior of a hollow chamber profile. The first plastic melt is allocated to the first melt-flow duct and to the second melt-flow duct and the second plastic melt is allocated to the third melt-flow duct. During the extrusion the second plastic melt is deposited onto the first plastic melt upstream from or in the region of the branch, and a distribution of the deposited second plastic melt is regulated using the distributing tool. The second melt-flow duct conveying the first plastic melt and the deposited second plastic melt is then merged with the first melt-flow duct in the profiling nozzle, whereupon the first plastic melt from the first melt-flow duct is deposited on the second plastic melt from the second melt flow duct, to sandwich the second plastic melt between two layers of the first plastic melt; and the united plastic melts are shaped to the hollow-chamber profiled panel during ejection from the profiling nozzle.

17 Claims, 3 Drawing Sheets

U.S. PATENT DOCUMENTS

| | | |
|---|---|---|
| 4,513,118 A | 4/1985 | Suetterlin et al. |
| 4,543,383 A | 9/1985 | Heil et al. |
| 4,569,875 A | 2/1986 | Pohlmann et al. |
| 4,647,489 A * | 3/1987 | Siol et al. .................... 428/119 |
| 6,100,561 A * | 8/2000 | Benz et al. .................. 428/119 |
| 6,424,406 B1 | 7/2002 | Mueller et al. |

FOREIGN PATENT DOCUMENTS

| | | |
|---|---|---|
| DE | 197 18 597 | 1/1999 |
| DE | 198 04 235 | 8/1999 |
| EP | 0 033 999 | 8/1981 |
| EP | 0 158 951 | 10/1985 |
| EP | 0 548 822 | 6/1993 |
| EP | 0 570 782 | 11/1993 |
| EP | 0 656 548 | 6/1995 |
| EP | 0 657 280 | 6/1995 |
| EP | 0 683 028 | 11/1995 |
| EP | 0 716 197 | 6/1996 |
| EP | 0 733 754 | 9/1996 |
| EP | 0 774 551 | 5/1997 |
| EP | 0 874 095 | 10/1998 |
| EP | 0 418 681 | 3/2001 |

* cited by examiner

EXTRUSION DIE FOR MAKING HOLLOW-CHAMBER PROFILED PANELS OF THERMOPLASTIC PLASTIC WITH INTERIOR COEXTRUDED LAYER

BACKGROUND OF THE INVENTION

1. Field of the Invention

The invention relates to an extrusion die for making a hollow-chamber profiled panel of thermoplastic plastic with an interior coextruded layer.

2. Discussion of the Background

German Patent DE 2544245 describes the use of panes of polymethyl methacrylate with a content of light-reflecting particles aligned parallel to the surface. The pigment particles used for this purpose impart, in the infrared region, selective reflection having a selectivity coefficient of greater than 1. $TiO_2$, lead carbonate and bismuth oxychloride are named as IR-reflecting pigments. The use of $TiO_2$ pigment of the anatase type, deposited in a layer thickness of about 120 μm on mica lamellas, is emphasized as particularly advantageous.

The particles are dispersed in concentrations of 0.01 to 1 wt % in a partly polymerized methyl methacrylate. The suspension is then fully polymerized to polymethyl methacrylate in a chamber between two glass plates. If this chamber is oriented horizontally, the pigment/mica particles contained therein become strongly aligned parallel to the pane surface as they settle, and so the desired IR-reflecting effect is developed in the fully polymerized panes. This parallel alignment of the IR-reflecting particles can be further improved by additionally rotating the glass plates of the chamber relative to one another a few times while the polymerizing material is still in the gel state.

DE 2544245 further mentions the possibility that the IR-reflecting pigments can also be incorporated in molding compounds. In such cases the pigments are supposedly aligned largely parallel to the surface during processing by calendering, extrusion or injection molding.

European Patent EP A 0548822 describes transparent, IR-reflecting members with sun-blocking and thermally insulating effect, such as plates, web plates or domelights, having a transmission (T) in the visible region of 45 to 75%, a total spectral transmission (g) of 30 to 60% and a T/g ratio of >1.15 (per DIN 67507). These IR-reflecting members can be made by coextrusion or coating processes such as lacquering or by reverse-roll coating from a stiff, amorphous base material of transparent plastic and a transparent coating material having a content of 20 to 40 wt % of red-reflecting and IR-reflecting particles comprising titanium dioxide deposited in a layer of 60 to 120 nm thickness on a lamellar substrate pigment. These IR-reflecting particles are contained in a coating layer of 5 to 40 microns thickness, adhering to the base material and comprising a transparent, water-insoluble binder, and are aligned parallel to the surface. In the examples, $TiO_2$ pigments of the rutile type are used. For coextrusion it is recommended that the binder selected for the IR-reflecting layer have lower melt viscosity than that of the base material.

Examples of commercial products are multiple-web plates of polymethyl methacrylate with coextruded IR-reflecting finish according to EP A 0548822. Also known are multiple-web plates of polycarbonate with appropriate IR-reflecting finish, wherein a further coextruded layer containing UV absorbers is also disposed on the coextruded pigment layer to impart weathering resistance.

DE 19618569 A1 describes a multi-layer interference pigment comprising a transparent substrate material coated with alternating layers of metal oxides having low and high refractive indices, the difference in refractive index being at least 0.1. In this way mica lamellas, for example, can be provided with an alternating layer of $TiO_2SiO_2/TiO_2$. Pigments such as described in DE 19618569 A1 are suitable for pigmenting sheetings for agricultural purposes, in order to hold back the infrared radiation of the sun and thus to prevent excessive heating, for example of greenhouses.

EP A 0733754 describes multiple-web plates made of impact-modified polymethyl methacrylate. It is further mentioned that it is possible to provide the inventive multiple-web plates additionally on the exterior or interior side with functional layers, such as scratch-resistant, anti-reflecting, water-repellent or even IR-reflecting coatings.

EP 0657280 describes a method for making plates of polycarbonate with a plurality of coextruded layers, which can contain pearlescent pigments and/or UV absorbers.

EP 0774551 A1 describes web plates of plastic, especially polycarbonate, which can contain, for example, IR-reflecting metal oxide pigments and UV absorbers in thin coextruded layers.

DE 19729093 C2 describes a method and a die for making web plates with a coating applied in the manner of stripes by coextrusion, for example with a coextrusion compound containing IR-reflecting pigments. It is mentioned that the coating can be applied both on the exterior and on the interior side of the chamber. However, the illustrated die is suitable only for exterior coating. In this method the coextrusion layer is applied in stripes on the base molding compound via a plurality of ducts in the outlet region of the profiling nozzle. It remains an open question as to how a corresponding interior coating would be achieved.

SUMMARY OF THE INVENTION

Thus, it is an object of the present invention to provide a die with which hollow-chamber profiled panels of thermoplastic plastic with a layered structure can be made from a top and bottom layer of one plastic melt and a layer of another plastic melt disposed in the interior of the hollow-chamber profile. Since only two plastic melts are needed, it is another object to avoid using more than two extruders for this purpose, in order to keep handling in the extrusion process simple and to minimize otherwise unavoidable startup, regulation and proportioning problems.

This and other objects have been achieved by the present invention the first embodiment which includes an extrusion die, comprising:

a distributing tool;

a profiling nozzle; and at least three melt-flow ducts;

wherein a first melt-flow duct is routed around a second melt-flow duct or the distributing tool using a branch and is merged again downstream from the branch;

wherein a third melt-flow duct opens into the second melt-flow duct;

wherein said extrusion die is suitable for extrusion of a hollow-chamber profiled panel of a thermoplastic plastic with a layered structure;

wherein said layered structure comprises a top layer and a bottom layer of a first plastic melt; and an intermediate layer of a second plastic melt disposed in an interior of a hollow chamber profile;

wherein said first plastic melt is allocated to said first melt-flow duct and to said second melt-flow duct and the second plastic melt is allocated to said third melt-flow duct;

wherein during said extrusion said second plastic melt is deposited onto said first plastic melt upstream from or in the region of the branch, thereby obtaining a deposited second plastic melt;

wherein a distribution of the deposited second plastic melt is regulated using the distributing tool;

wherein said second melt-flow duct conveying the first plastic melt and the deposited second plastic melt is then merged with the first melt-flow duct in the profiling nozzle, whereupon the first plastic melt from the first melt-flow duct is deposited on the second plastic melt from the second melt flow duct, to sandwich the second plastic melt between two layers of the first plastic melt, thereby obtaining united plastic melts; and wherein the united plastic melts are shaped to said hollow-chamber profiled panel during ejection from the profiling nozzle.

In another embodiment the present invention includes a process for making a hollow-chamber profiled panel, comprising:

coextruding a first plastic melt and a second plastic melt using the above extrusion die.

In yet another embodiment the present invention relates to a hollow-chamber profiled panel made by the above process.

DETAILED DESCRIPTION OF THE INVENTION

Figure 1:
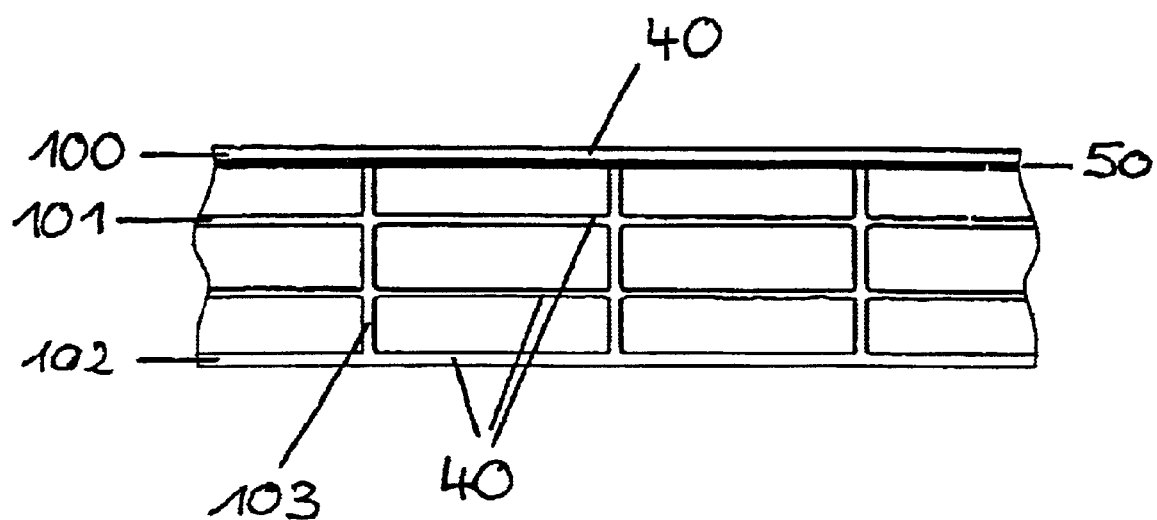
FIG. 1 shows an Example of a quadruple-web plate, wherein (40) is the layer of plastic melt (4); (50) is the layer of plastic melt (5); (100) is the top flange; (101) is the intermediate flange; (102) is the bottom flange; (103) are the webs.

The present invention relates to an extrusion die for extrusion of hollow-chamber profiled panels of thermoplastic plastic. The panels have a layered structure comprising a top and bottom layer (40) of a plastic melt (4) and a layer (50) of a plastic melt (5) disposed in the interior of the hollow-chamber profile. Particularly preferred is coextrusion.

The extrusion die is provided with a distributing tool (1), a profiling nozzle (9) and at least three melt-flow ducts (2a, 2b, 3), in which plastic melt (4) is allocated to melt flow ducts (2a) and (2b) and plastic melt (5) is allocated to melt flow duct (3).

Melt flow duct (2a) is routed around melt flow duct (2b) or distributing tool (1) by means of a branch (20a) and is merged again downstream from the branch.

Plastic melt (5) is deposited onto plastic melt (4) upstream from or in the region of branch (20a) by the fact that melt flow duct (3) opens into melt-flow duct (2b) and the distribution of deposited plastic melt (5) can be regulated by means of a distributing tool (1).

Melt-flow duct (2b) conveying plastic melt (4) and deposited plastic melt (5) is then merged with melt-flow duct (2a) in profiling nozzle (9), whereupon plastic melt (4) from melt-flow duct (2a) is deposited on plastic melt (5) from melt-flow duct (2b), thus sandwiching this melt between two layers of melt (4).

The united plastic melts are shaped to a hollow-chamber profiled panel during ejection from profiling nozzle (9).

The die according to the present invention offers the advantage that hollow-chamber profiled panels of thermoplastic plastic having the said layered structure with a continuous interior middle layer can be made using only two melt streams.

The invention further relates to a method for making multi-layer hollow-chamber profiled panels of thermoplastic plastic, wherein the panels have a layered structure comprising a top and bottom layer (40) of a plastic melt (4) and a layer (50) of a plastic melt (5) disposed in the interior of the hollow-chamber profile by means of coextrusion, using the extrusion die of the present invention.

The method offers the advantage that, despite the three-layer structure of the resulting hollow-chamber profiled panel, only two melt streams have to be regulated. The method is therefore easier to control than a method in which three melt streams must be fed from three extruders.

The invention further relates to a hollow-chamber profiled panel that can be made by the above method from thermoplastic plastic wherein the panels have a layered structure comprising a top and bottom layer (40) of a plastic melt (4) and a continuous layer (50) of a plastic melt (5) disposed in the interior of the hollow-chamber profile (see FIG. 1).

The hollow-chamber profiled panel according to the present invention offers the advantage that a functional layer in the interior of the hollow-chamber profile, such as an IR-reflecting layer, is protected from weathering and mechanical influences by the overlying layer. Compared with the hollow member described in DE 19729093 C2, there exists the further advantage that a better functional effect is achieved, since the hollow-chamber profiled panel is continuous instead of being present only in stripes.

The invention relates to an extrusion die for extrusion of hollow-chamber profiled panels of thermoplastic plastic. The panels have a layered structure comprising a top and bottom layer (40) of a plastic melt (4) and a layer (50) of a plastic melt (5) disposed in the interior of the hollow-chamber profile by means of coextrusion.

The extrusion die is provided with a distributing tool (1), a profiling nozzle (9) and at least three melt flow ducts (2a, 2b, 3), in which plastic melt (4) is allocated to melt flow ducts (2a) and (2b) and plastic melt (5) is allocated to melt flow duct (3).

Melt-flow duct (2a) is routed around melt-flow duct (2b) or distributing tool (9) by means of a branch (20a) and is merged again downstream from the branch.

Plastic melt (5) is deposited onto plastic melt (4) upstream from or in the region of branch (20a) by the fact that melt-flow duct (3) opens into melt-flow duct (2b) and the distribution of deposited plastic melt (5) can be regulated by means of a distributing tool (1).

Melt-flow duct (2b) conveying plastic melt (4) and deposited plastic melt (5) is then merged with melt-flow duct (2a)

in profiling nozzle (9), whereupon plastic melt (4) from melt-flow duct (2a) is deposited on plastic melt (5) from melt-flow duct (2b), thus sandwiching this melt between two layers of melt (4), and the united plastic melts are shaped to a hollow-chamber profiled panel during ejection from profiling nozzle (9).

A particularly important aspect of the die is branch (20a). Melt flow duct (2a) can be routed around melt-flow duct (2b) or distributing tool (1) by means of a branch (20a) and is merged again downstream from the branch.

This permits two particularly preferred embodiments (see FIG. 2a, 2b, and FIG. 3a, 3b).

A preferred embodiment of the extrusion die is characterized in that melt-flow duct (2b) is disposed between melt-flow ducts (3) and (2a), melt-flow duct (3) opens into melt-flow duct (2b) upstream from branch (20a), whereupon plastic melt (5) is deposited on plastic melt (4) and distribution of deposited plastic melt (5) can be accomplished at this place by means of distributing tool (1), which also opens into this place, melt-flow duct (2a) is routed around melt-flow duct (2b) by means of branch (20a), melt-flow duct (2b) conveying plastic melt (5) and deposited plastic melt (4) is routed through branch (20a) and then melt-flow ducts (2a) and (2b) are merged in profiling nozzle (9), so that plastic melt (4) from melt-flow duct (2a) is merged onto plastic melt (5) from melt-flow duct (2b).

Figure 2A:
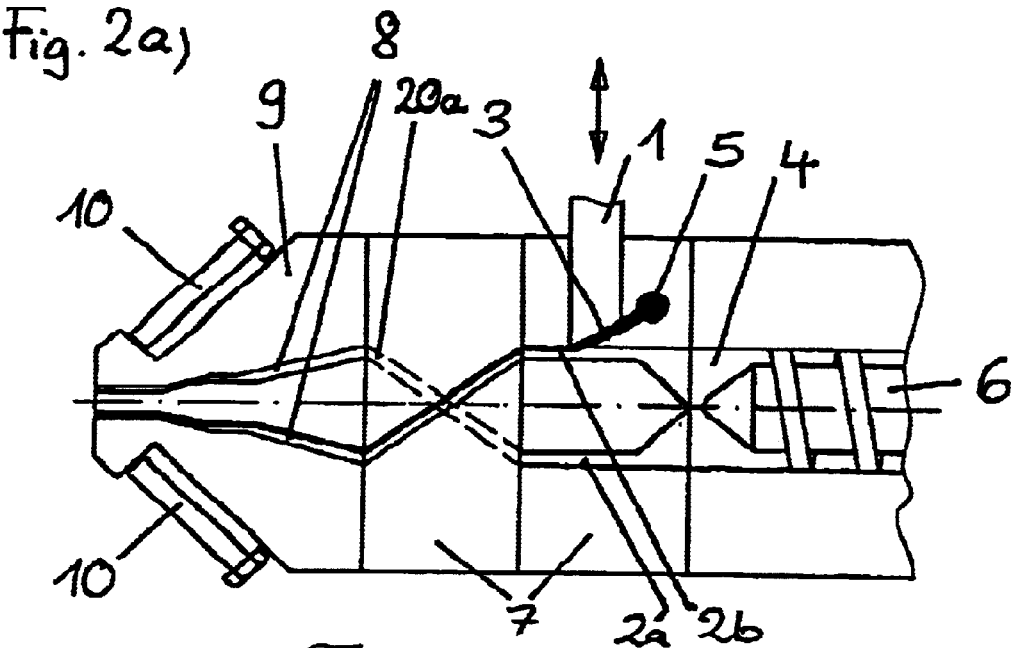
FIG. 2a shows an extrusion die in cross section.
Figure 2B:
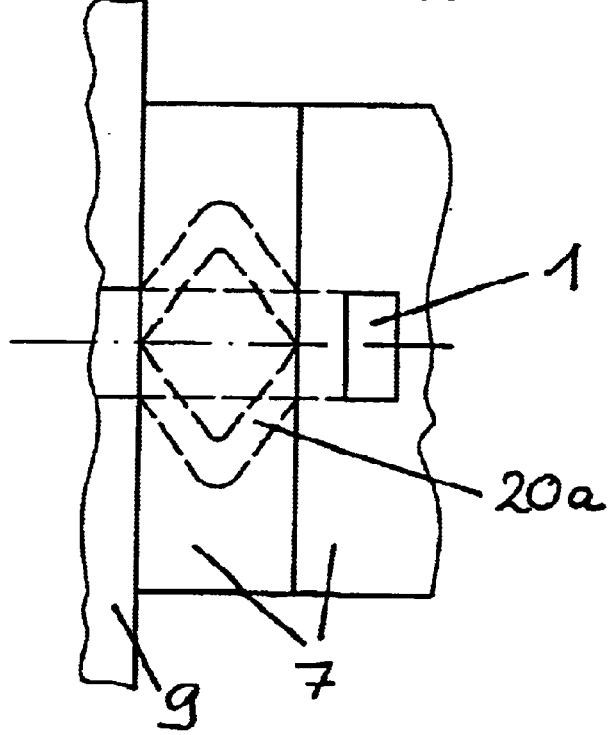
FIG. 2b shows details of the region around branch (20a) in top view, wherein (1) is the distributing tool; (2a) is the melt-flow duct 2a; (2b) is the melt-flow duct 2b; (3) is the melt-flow duct 3; (4) is the plastic melt (4); (5) is the plastic melt (5); (6) is the extruder screw; (7) is the exchangeable adapter (two-piece in this case); (8) is the distributing duct; (9) is the profiling nozzle; (10) is the final controlling element (20a) is the branch (20a).

In the embodiment shown in FIGS. 2a and 2b, melt-flow duct (3) is disposed above melt-flow duct (2b), which in turn is disposed above melt-flow duct (2a) in this region. Melt-flow duct (2b) is therefore disposed between melt-flow ducts (3) and (2a).

In this arrangement, plastic melt (4) is fed by a primary extruder into melt-flow ducts (2a) and (2b). Preferably a smaller secondary extruder feeds plastic melt (5) from the side or from above via an inlet (5a) into melt-flow duct (3).

Melt-flow duct (3) opens into melt-flow duct (2b) upstream from branch (20a), whereupon plastic melt (5) is deposited on plastic melt (4). At this place the distribution of deposited plastic melt (5) is regulated by means of distributing tool (1). Melt-flow duct (2a) is routed around melt-flow duct (2b) by means of branch (20a) and then upward. Melt-flow duct (2b) conveying plastic melt (4) and deposited plastic melt (5) is routed downward through branch (20a). Melt-flow ducts (2a) and (2b) are merged in profiling nozzle (9). Plastic melt (4) from meltflow duct (2a) is then united with plastic melt (5) from melt-flow duct (2a). The desired layered structure is obtained.

The extrusion die according to FIGS. 2a and 2b can also be configured differently, for example inversely, so that the conditions from top to bottom, for example, can be interchanged.

A further preferred embodiment of the extrusion die is characterized in that melt-flow duct (3) is disposed between melt-flow ducts (2a) and (2b), melt-flow duct (3) opens into melt-flow duct (2b) in the region of branch (20a), whereupon plastic melt (5) is deposited on plastic melt (4) and distribution of deposited plastic melt (5) can be accomplished at this place by means of distributing tool (1), which also opens into this place, melt-flow duct (2a) is routed around distributing tool (1) by means of branch (20a), melt-flow duct (2b) conveying plastic melt (4) and deposited plastic melt (5) and the melt-flow ducts conveying melt (4) are merged in profiling nozzle (9), so that plastic melt (4) from melt-flow duct (2a) is merged onto plastic melt (5) from melt-flow duct (2b).

Figure 3A:
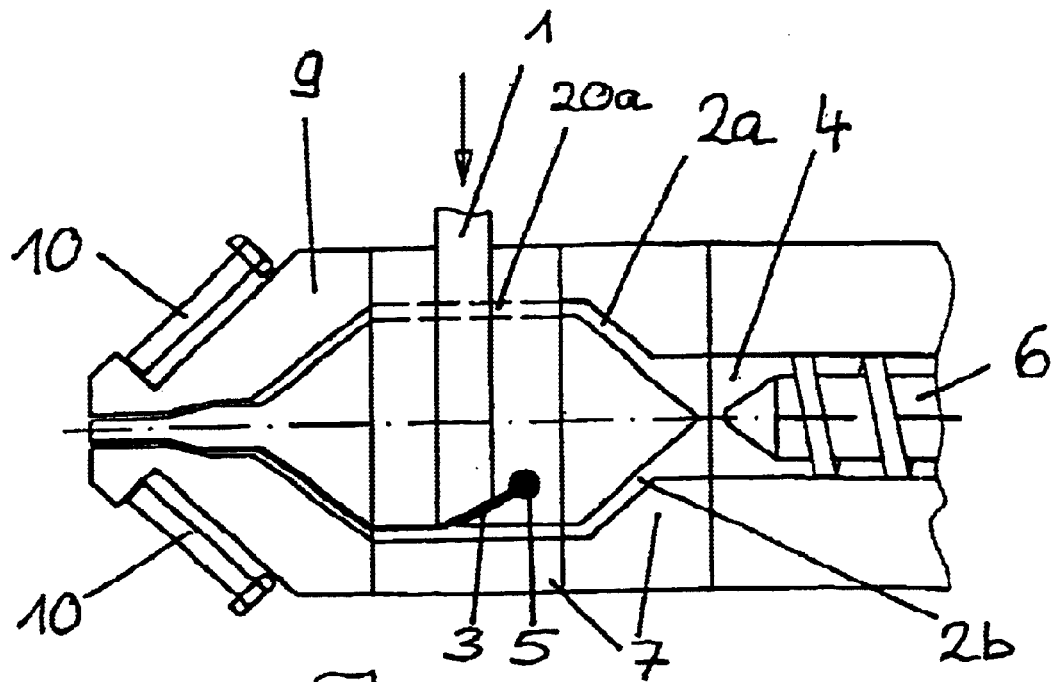
FIG. 3a shows an extrusion die in cross section.
Figure 3B:
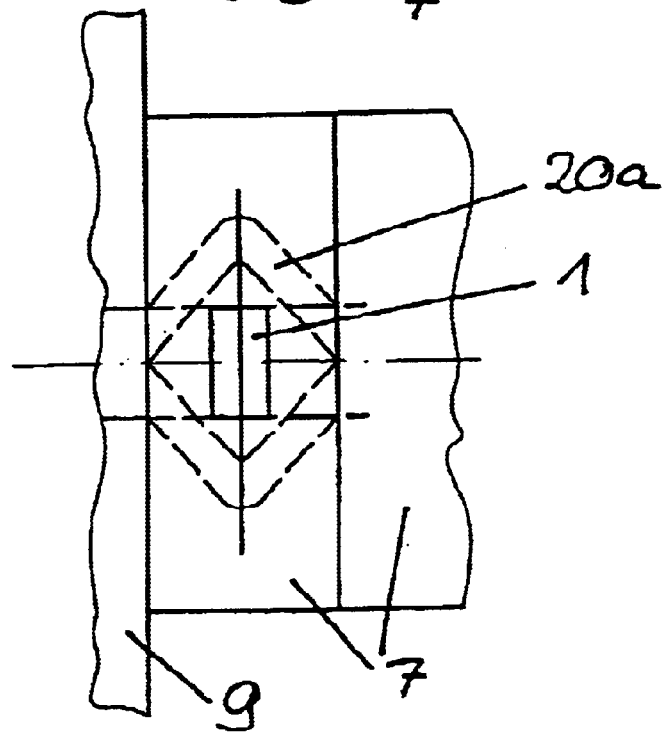
FIG. 3b shows details of the region around branch (20a) in top view, wherein (1) is the distributing tool; (2a) is the melt-flow duct 2a; (2b) is the melt-flow duct 2b; (3) is the melt-flow duct 3; (4) is the plastic melt (4); (5) is the plastic melt (5); (6) is the extruder screw; (7) is the exchangeable adapter (two-piece in this case); (9) is the profiling nozzle; (10) is the final controlling element (20a) is the branch (20a).

In the embodiment shown in FIGS. 3a and 3b, melt-flow duct (2a) is disposed above melt-flow duct (3), which in turn is disposed above melt flow duct (2b) in this region. Melt flow duct (3) is therefore disposed between melt flow ducts (2a) and (2b).

In this arrangement, plastic melt (4) is fed by a primary extruder into melt-flow ducts (2a) and (2b). Preferably a smaller secondary extruder feeds plastic melt (5) from the side via an inlet (5a) into melt-flow duct (3).

Melt flow duct (3) opens into melt-flow duct (2b) in the region of branch (20a) or under branch (20a), whereupon plastic melt (5) is deposited on plastic melt (4). At this place the distribution of deposited plastic melt (5) is regulated by means of distributing tool (1). Melt flow duct (2a) disposed thereabove is routed around distributing tool (1) by means of branch (20a). Melt flow ducts (2a) and (2b) are merged in profiling nozzle (9). Plastic melt (4) from melt flow duct (2a) is then united with plastic melt (5) from melt-flow duct (2a). The desired layered structure is obtained.

The extrusion die according to FIGS. 3a and 3b can also be configured differently, for example inversely, so that the conditions from top to bottom, for example, can be interchanged.

The united melt streams are distributed by a distributing duct (8) and shaped to a hollow-chamber profile with the appropriate layered structure during ejection through a shaping profile nozzle (9).

The extrusion die according to the present invention comprises a distributing tool (1), which preferably can be an adjustable slide-type adapter or particularly preferably a multiple-leaf adapter.

Adjustable adapters are known from German Unexamined Application DE-OS 3741793. They comprise exchangeable one-piece or multi-piece slides, whose profile was adapted beforehand to the desired distribution profile.

Multiple-leaf adapters are known from European Patent EP 0418681 A2. In this case the width of the extrusion profile can be influenced by a plurality of final controlling elements known as leafs. Regulation can be achieved via a feedback loop, which regulates the position of the leafs and also the throughput of the extruder on the basis of the layer thicknesses and deposit widths measured on the extrusion product.

Adaptation of the distribution by means of the distributing tool is accomplished by final controlling elements (10), which are components of distributing tool (1) and are accessible on the top side of the extrusion die. They can be, for example, bolts, thermo bolts or piezoelectric translators (see, for example, EP 0418681 A2).

By its geometric configuration, profiling nozzle (9) achieves profiling of the melts to a hollow-chamber profiled panel, preferably a web plate with a top and bottom flange, if necessary intermediate flanges (in the case of multiple-web plates or truss plates) and interposed vertical or diagonal webs. The hollow-chamber panel has in particular, on the exterior, the substantially rectangular geometry of a double-web plate, a multiple-web plate or a truss plate. FIG. 1 shows a quadruple-web plate with a top flange (100), a bottom flange (102), two intermediate flanges (101) and vertical webs (103).

The profiling nozzle contains distributing ducts (8) which first of all distribute the melts over the width. In top view the distributing ducts usually have the shape of a coathanger. The geometry is adapted in a way known in itself to ensure that relatively uniform distribution of the melt layers over the width already results without any influence on the part of distributing tool (1).

Melt ducts (2a) and (2b) are united in the outlet region of profiling nozzle (9). In the outlet region, profiling nozzle (9) has a profile complementary to that of the hollow-chamber profiled panel to be made. Usually appropriate final controlling elements (10) for the nozzle lips are provided in the outlet region for fine adjustment of profiling nozzle (9).

Preferably the extrusion die can have multi-piece construction, wherein the portion in which melt-flow duct (2a) is routed around melt-flow duct (2b) or the optionally provided distributing tool (1) by means of a branch (20a) and is merged again downstream from the branch is disposed in a one-piece or multi-piece exchangeable adapter (7). This has the advantage that parts of already existing extrusion dies, such as a profiling nozzle and/or a connecting piece to the extruder, can be combined with this adapter or these adapters (7).

The present invention further relates to a method for making multi-layer hollow-chamber profiled panels of thermoplastic plastic with a layered structure comprising a top and bottom layer (40) of a plastic melt (4) and a layer (50) of a plastic melt (5) disposed in the interior of the hollow-chamber profile by means of coextrusion of plastic melts (4) and (5), using the extrusion die of the present invention and then sizing the obtained extruded product.

For this purpose the process conditions, temperatures and delivery flows appropriate for the respective plastic can be used in the known way or adapted within the routine familiar to those skilled in the art. After ejection from profiling nozzle (9), the extruded product will be cooled in standard manner by feeding it to a sizing device, preferably a vacuum-type dry-sizing unit. Suitable sizing devices are known, for example, from DE C 3244953 (=EP B 0158951) or from DE 19804235 (=EP A 0936052).

Preferably there are made web plates with a top flange (100), a bottom flange (102), if necessary intermediate flanges (101) and vertical or diagonal webs (103) disposed between the flanges, especially double-web plates, multiple-web plates or truss plates.

The invention further relates to a hollow-chamber profiled panel, preferably with substantially rectangular cross section, that can be made by the method according to the present invention from thermoplastic plastic with a layered structure comprising a top and bottom layer (40) of a plastic melt (4) and a continuous layer (50) of a plastic melt (5) disposed in the interior of the hollow chamber profile. Continuous layer (50) is disposed on one side in the interior of the hollow-chamber profile, or in other words on the top or bottom, and thus is at least partly uncovered, but in this position is better protected from mechanical or weather-induced influences than a corresponding layer disposed on the exterior of the plate.

The hollow-chamber profiled panel is preferably has a top flange, a bottom flange, if necessary intermediate flanges (in the case of multiple-web plates or truss plates) and interposed vertical or diagonal webs. In particular, the hollow-chamber panel has, on the exterior, the substantially rectangular geometry of a double-web plate, a multiple-web plate or a truss plate.

FIG. 1 shows a quadruple-web plate with a top flange (100), a bottom flange (102), two intermediate flanges (101) and vertical webs (103).

The hollow-chamber profiled panel is preferably characterized in that the flanges and the interposed webs are made substantially of the plastic of plastic melt (4) and in that a continuous interior flange layer of the plastic of plastic melt (5), seated on webs, is present on one side.

The hollow-chamber profiled panel is preferably characterized in that the flanges (100,102) have a thickness of 0.5 to 4 mm, the continuous interior flange layer has a thickness of 10 to 250 $\mu$m and the total thickness of the web plate ranges between 8 and 40 mm. The thickness of the flanges includes all values and subvalues therebetween, especially including 1, 1.5, 2, 2.5, 3 and 3.5 mm. The thickness of the interior flange layer includes all values and subvalues therebetween, especially including 20, 40, 60, 80, 100, 120, 140, 160, 180, 200, 220 and 240 $\mu$m. The total thickness of the web plate includes all values and subvalues therebetween, especially including 10, 15, 20, 25, 30 and 35 mm.

The hollow-chamber profiled panel is preferably characterized in that the continuous interior flange layer is made of thermoplastic plastic, which contains an inorganic or organic pigment, a coloring agent, a pearlescent pigment and/or an impact modifier and/or light-scattering beads and/or a light-scattering agent.

The hollow-chamber profiled panel preferably contains an IR-reflecting pearlescent pigment in the continuous interior flange layer.

The transparency T (tau/d65 according to DIN 67507) of such a panel preferably ranges between 15 and 75%. The transparency includes all values and subvalues therebetween, especially including 20, 25, 30, 35, 40, 45, 50, 55, 60, 65 and 70%. As an example, there can be provided IR-reflecting pearlescent pigments or IR-reflecting particles in which the substrate pigment, such as mica, is coated with a $TiO_2$ layer 90 to 150 nm thick. The thickness of the $TiO_2$ layer includes all values and subvalues therebetween, especially including 100, 110, 120, 130 and 140 mm. As another example, there can also be provided IR-reflecting particles in which the substrate pigment is coated with alternating layers of metal oxides. Also suitable are IR-reflecting particles which comprise alternating layers of metal oxides of $TiO_2/SiO_2/TiO_2$, wherein the sum of the layer thicknesses is 150 to 300 nm. The sum of the layer thicknesses includes all values and subvalues therebetween, especially including 160, 170, 180, 190, 200, 210, 220, 230, 240, 250, 260, 270, 280 and 290 nm.

Suitable IR-reflecting pigments, IR-reflecting particles comprising lamellar substrate pigments coated with a metal oxide are known, for example, from DE 2544245 B2, EP A 548822 and DE 19618569 A1.

IR-reflecting particles are known, for example, as pearlescent pigments. They have layered or lamellar structure. Usually they have a diameter of 20 to 100 microns. From the physical viewpoint, infrared reflection is due to double reflection of the light at the top and bottom sides of particles aligned parallel to the surface. Depending on the thickness of the particle and the wavelength of the incident light, the rays reflected at the top side and bottom side of the particle can combine with one another by either constructive or destructive interference. Constructive interference of the reflected radiation takes place when $$d = (2x-1)L_r/4n,$$

where d is the thickness of the particle, x=1, $L_r$ is the wavelength of the reflected radiation and n is the refractive index of the particle at this wavelength. In contrast, destructive interference or attenuation of the reflected light takes place when $$d = (x-1)L_t/2n,$$

where x=2 and $L_t$ is the wavelength of the light that in this case is not reflected but is transmitted. Combination of the two equations yields $$L_r=2L_t.$$

It follows that, at a given layer thickness d, light of wavelength $L_r$ is reflected most strongly and light of half that wavelength, or $L_t$, is transmitted most strongly. According to the invention, the thickness of the particles is selected to ensure that light in the visible region passes through the particle and light in the infrared region is reflected most strongly.

Various pigments are known that satisfy the indicated ratio of thickness and refractive index. They include titanium dioxide, especially of the anatase type, basic lead carbonate or bismuth oxychloride. Particularly advantageous is titanium dioxide of the rutile type, which has been deposited on mica particles or similar lamellar mineral substances in well-defined layer thicknesses. This pigment yields light-scattering coatings, which are particularly preferred for all kinds of roof glazing units and skylights. In contrast to the anatase type, this pigment does not react catalytically with the plastic matrix, and thus it permits a weathering-resistant product having a long service life. Size-fractionated products whose mica particles have a mean diameter of 10 to 20 μm are particularly suitable, since they are less susceptible to breaking during processing. The mean diameter of the mica particles includes all values and subvalues therebetween, especially including 12, 14, 16 and 18 μm. The measurement can be accomplished by laser diffraction.

Preferably at least 95%, more preferably at least 98% and most preferably at least 99% of the particles have a size smaller than 25 μm.

Preferably there are used IR-reflecting particles in which the substrate pigment, for example mica, is coated with a $TiO_2$ layer of 90 to 150 nm, preferably 100 to 140 nm thickness (the layer thickness d then refers only to the $TiO_2$ layer, not to the mica substrate). The thickness of the $TiO_2$ layer includes all values and subvalues therebetween, especially including 95, 100, 105, 110, 115, 120, 125, 130, 135 and 140 mm.

Also suitable are IR-reflecting particles in which the substrate pigment is coated with alternating layers of metal oxides. DE 19618569 A1 describes corresponding multi-layer interference pigments comprising transparent substrate materials coated with alternating layers of metal oxides having low and high refractive indices, the difference in refractive index being at least 0.1. In this way mica lamellas, for example, can be provided with an alternating layer of $TiO_2/SiO_2/TiO_2$, wherein the sum of the layer thicknesses can range from 150 to 300 nm (a suitable example is the commercial pearlescent pigment AC 870, made by Merck KGaA, Darmstadt, Germany).

For extrusion of interior continuous layer (50) in hollow-chamber profiled panels of polymethyl methacrylate there is preferably used a molding compound of polymethyl methacrylate containing the IR-reflecting particles in the form of granules of a premix comprising 5 to 40 wt % of IR-reflecting particles with a low-viscosity thermoplastic polymethyl methacrylate. Thereby the proportion of breakage can be kept low. The amount of IR-reflecting particles includes all values and subvalues therebetween, especially including 10, 15, 20, 25, 20 and 35 wt %.

Interior continuous layer (50) can contain an impact modifier, for example for polyvinyl chloride or for polymethyl methacrylate. In a particularly preferred embodiment, the interior continuous layer comprises impact-resistant polymethyl methacrylate.

Impact-modified polymethyl methacrylate is known, for example, from EP A 0733754.

The impact-resistant polymethyl methacrylate can be composed, for example, of p1) 4 to 30 wt % of an elastomer phase and of p2) 70 to 96 wt % of a thermoplastic matrix phase of polymethyl methacrylate, which can contain up to 20 parts by weight per 100 parts by weight P of suitable comonomer constituents wherein the refractive index of the elastomer phase E and of the matrix phase M differ from one another by at most n≦0.02 and wherein the sum of p1)+p2) is equal to 100 wt %. The amount of elastomer phase in p1) includes all values and subvalues therebetween, especially including 5, 10, 15, 20 and 25 wt %. The amount of a thermoplastic matrix phase of polymethyl methacrylate in p2) includes all values and subvalues therebetween, especially including 72, 74, 76, 78, 80, 82, 84, 86, 88, 90, 92 and 94 wt %.

The elastomer phase, comprising a cross-linked polymer phase, is composed of 60 to 99.9 parts by weight of alkyl acrylate and/or aryl acrylate, of 0.1 to 10 parts by weight of suitable cross-linking agents and if necessary of 0 to 30 parts by weight of suitable monofunctional ethylenically unsaturated monomers. The amount of alkyl acrylate and/or aryl acrylate includes all values and subvalues therebetween, especially including 65, 70, 75, 80, 90, 95 and 99 parts by weight. The amount of cross-linking agent includes all values and subvalues therebetween, especially including 0.5, 1, 1.5, 2, 2.5, 3, 3.5, 4, 4.5, 5, 5.5, 6, 6.5, 7, 7.5, 8, 8.5, 9 and 9.5 parts by weight. The amount of monofunctional ethylenically unsaturated monomers includes all values and subvalues therebetween, especially including 5, 10, 15, 20 and 25 parts by weight.

As the alkyl acrylates there are preferably used $C_2$ to $C_{10}$ alkyl acrylates, such as ethyl acrylate, propyl acrylate, isopropyl acrylate, amyl acrylate, hexyl acrylate, octyl acrylate, decyl acrylate and, particularly preferably, butyl acrylate and 2-ethylhexyl acrylate. Preferred aryl acrylates are phenyl acrylate, 2-phenylethyl acrylate, 3-phenyl-1-propyl acrylate, 2-phenoxyethyl acrylate, 2-phenoxyethoxyethyl acrylate and, particularly preferably, benzyl acrylate. The cross-linking agents are generally compounds with at least two ethylenically unsaturated moieties capable of radical polymerization. As representative examples of compounds with two ethylenically unsaturated moieties capable of radical polymerization there can be mentioned: (meth)acrylic esters of diols, such as ethylene glycol di(meth)acrylate or 1,4-butanediol di(meth)acrylate, aromatic compounds such as divinylbenzene, and compounds with at least one allyl group, such as allyl (meth) acrylate. As examples of cross-linking agents with three or more ethylenically unsaturated moieties capable of radical polymerization there can be mentioned triallyl cyanurate, trimethylolpropane tri(meth)acrylate and pentaerythritol tetra(meth)acrylate. Further examples for this purpose are cited in U.S. Pat. No. 4,513,118.

The comonomers contained if necessary in proportions of 0 to 30 parts by weight in the elastomer phase are used mainly to adjust the usually lower refractive index of the elastomer phase to that of the matrix phase M. The amount of comonomer includes all values and subvalues therebetween, especially including 5, 10, 15, 20 and 25 parts by weight. Preferably, therefore, there are used comonomers with relatively high refractive indices, such as aromatic compounds capable of radical polymerization. Examples are vinyltoluene, styrene or methylstyrene, which are used in such proportions that they will not impair the weathering resistance of the impact-resistant polymethyl methacrylate.

The matrix phase M, which is covalently bonded in a proportion of at least 5 wt % to the elastomer phase, comprises a polymethyl methacrylate P, which is composed of 80 to 100 parts by weight of methyl methacrylate units and has a glass transition temperature of at least 70° C. The amount of the methyl methacrylate unit includes all values and subvalues therebetween, especially including 85, 90 and 95 parts by weight. Furthermore, 0 to 20 parts by weight of further ethylenically unsaturated comonomer units capable of radical polymerization, preferably alkyl (meth)acrylates with 1 to 4 carbon atoms in the alkyl group, can be present in the polymethyl methacrylate. The amount of ethylenically unsaturated comonomer units includes all values and subvalues therebetween, especially including 4, 8, 12 and 16 parts by weight. The weight-average molecular weight $M_W$ of the polymethyl methacrylate ranges preferably between $10^4$ and $10^6$ daltons, more preferably between $3 \times 10^4$ and $5 \times 10^5$ daltons (examples of the determination of $M_W$ can be found in H. F. Mark et al., Encyclopedia of Polymer Science and Engineering, 2nd Edition, Vol. 10, pp. 1 ff., J. Wiley, New York, 1989). The $M_W$ includes all values and subvalues therebetween, especially including $5 \times 10^4$, $10^5$ and $5 \times 10^5$ daltons.

Preferably the elastomer phase is a component of two-stage or multi-stage emulsion polymers, whose exterior envelope comprises the polymethyl methacrylates forming the matrix phase. Particularly preferred are emulsion polymers with at least three-stage composition, formed from a core of polymethyl methacrylate, a first shell S1 of the elastomer phase and a second shell S2 of polymethyl methacrylate, while further shells corresponding to shells S1 and S2 can be adjoined in alternation. The proportion of emulsion polymers in the impact-resistant polymethyl methacrylate ranges between 5 and 70 wt %, preferably between 10 and 50 wt %, while polymethyl methacrylate plastic not contained in the latex particles accounts for the remaining fraction of the weight. The amount of impact resistant polymethyl methacrylate includes all values and subvalues therebetween, especially including 10, 15, 20, 25, 30, 35, 40, 45, 50, 55, 60 and 65 wt %. Preferably the impact-resistant polymethyl methacrylate is prepared by mixing the emulsion polymer with the polymethyl methacrylate, in a procedure in which, for example, the constituents are mixed and then the aqueous phase and the emulsifiers are separated, or in which the emulsion polymer is first isolated from the aqueous phase and then mixed in molten form with the polymethyl methacrylate obtained, for example, by continuous bulk polymerization. The latex particles constituting the emulsion polymer preferably have a diameter of between 0.1 and 3 $\mu$m, more preferably between 0.15 and 1 $\mu$m. The diameter of the latex particles includes all values and subvalues therebetween, especially including 0.5, 1, 1.5, 2 and 2.5 $\mu$m. In principle, the composition of such latex particles and the isolation of the emulsion polymer for two-stage emulsion polymers is described, for example, in EP 0033999 (=U.S. Pat. No. 4,543,383) and for three-stage emulsion polymers is described, for example, in EP 0113925 (=U.S. Pat. No. 4,513,118). During aqueous emulsion polymerization, it is expedient to work in the neutral or slightly acid pH range, in which case the use of long-chain alkyl sulfates or alkyl sulfonates as emulsifiers is favorable. As the polymerization initiators there can be expediently used the relevant known azo compounds or organic or inorganic peroxides, such as persulfates, which are generally used in proportions of between $10^{-3}$ and 1 wt % relative to the monomers. The amount of polymerization initiator includes all values and subvalues therebetween, especially including $5 \times 10^{-3}$, $10^{-2}$, $5 \times 10^{-2}$, $10^{-1}$ and $5 \times 10^{-1}$. To adjust the aforesaid molecular weight $M_W$ of the polymethyl methacrylate present in the emulsion polymer there are used the relevant known molecular-weight regulators, such as mercapto compounds, examples of which are 2-ethylhexyl thioglycolate or tert-dodecylmercaptan.

Emulsion polymers that have been coagulated and dewatered in an extruder are particularly preferred. In the dewatering zone of such an extruder, the melt is divided into several portions, which are fed respectively to separate screw channels. In the process, the melt phase in at least one of these screw channels is compressed to a continuous melt cake in the feed gap of the twin screw, the pressure gradient developed being confined within a locally narrow zone. The water upstream from the boundary of the melt cake is then allowed to flow downward by gravity through at least one drain hole, in such a way that the melt the cake is not in contact with a continuous aqueous phase. Thereby the additives and impurities contained in the water are effectively removed, and so there is obtained a material that is particularly stable to weathering and that does not tend to yellowing (in this regard see EP A 0683028 and, for a two-stage process, DE 19798597 C1).

Interior continuous layer (50) can contain light-scattering beads in concentrations of 0.1 to 30 wt %, preferably 0.5 to 10 wt %. The amount of light scattering beads includes all values and subvalues therebetween, especially including 5, 10, 15, 20 and 25 wt %.

Light scattering beads comprising copolymers of methyl methacrylate and styrene or benzyl methacrylate, which in addition can be cross-linked, are known, for example, from DE 3528165 C2, EP 570782 B1 or EP 656548 A2.

Practically all thermoplastics from which hollow-chamber profiled panels can be made merit consideration. Preferred examples are acrylonitrile-butadiene-styrene graft copolymers (ABS), polyamides, polyethylene terephthalate, polybutylene terephthalate, polyvinyl chloride, polystyrene, polycarbonate and, particularly preferably, polymethyl methacrylate.

For example, a polymethyl methacrylate comprising 80 to 100 wt % of methyl methacrylate units and if necessary 0 to 20 wt % of further copolymerizable monomers is suitable. Examples of such monomers are hydroxyethyl methacrylate, butyl acrylate, ethyl acrylate or, preferably, methyl acrylate. The molecular weight $M_W$ (weight-average, determined by DSC or by gel chromatography, for example), can range, for example, from $5 \times 10^4$ to $2 \times 10^5$. The $M_W$ includes all values and subvalues therebetween, especially including $6 \times 10^4$, $7 \times 10^4$, $8 \times 10^4$, $9 \times 10^4$ and $10^5$.

The hollow-chamber profiled panels of the present invention can be used, for example, as roofing or cladding panels.

German patent application 101 29 702.5, filed Jun. 22, 2001, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. An extrusion die, comprising:
   a distributing tool;
   a profiling nozzle; and
   at least three melt-flow ducts;
   wherein a first melt-flow duct is routed around a second melt-flow duct of the distributing tool using a branch and is merged again downstream from the branch;

wherein a third melt-flow duct opens into the second melt-flow duct;

wherein said extrusion die is suitable for extrusion of a hollow-chamber profiled panel of a thermoplastic plastic with a layered structure;

wherein said layered structure comprises a top layer and a bottom layer of a first plastic melt; and an intermediate layer of a second plastic melt disposed in an interior of a hollow chamber profile;

wherein said first plastic melt is allocated to said first melt-flow duct and to said second melt-flow duct and the second plastic melt is allocated to said third melt-flow duct;

wherein during said extrusion said second plastic melt is deposited onto said first plastic melt upstream from or in the region of the branch, thereby obtaining a deposited second plastic melt;

wherein a distribution of the deposited second plastic melt is regulated using the distributing tool;

wherein said second melt-flow duct conveying the first plastic melt and the deposited second plastic melt is then merged with the first melt-flow duct in the profiling nozzle, whereupon the first plastic melt from the first melt-flow duct is deposited on the second plastic melt from the second melt flow duct, to sandwich the second plastic melt between two layers of the first plastic melt, thereby obtaining united plastic melts; and wherein the united plastic melts are shaped to said hollow-chamber profiled panel during ejection from the profiling nozzle.

2. The extrusion die according to claim 1, wherein the second melt-flow duct is disposed between the first melt-flow duct and the third melt-flow duct;

wherein the third melt flow duct opens into the second melt-flow duct upstream from the branch;

wherein during said extrusion the second plastic melt is deposited on the first plastic melt, thereby obtaining the deposited second plastic melt, and distribution of the deposited second plastic melt is accomplished using the distributing tool which also opens into the second melt-flow duct;

wherein the first melt flow duct is routed around the second melt-flow duct using the branch;

wherein the second melt-flow duct conveying the second plastic melt and the deposited first plastic melt is routed through the branch and then the first melt-flow duct and the second melt-flow duct are merged in the profiling nozzle, so that the first plastic melt from the first melt-flow duct is merged onto the second plastic melt from the second melt-flow duct.

3. The extrusion die according to claim 1, wherein the third melt-flow duct is disposed between the second melt-flow duct and the first melt-flow duct;

wherein the third melt-flow duct opens into the second melt-flow duct in the region of the branch;

wherein, during said extrusion, the second plastic melt is deposited on the first plastic melt, thereby obtaining the deposited second plastic melt and distribution of the deposited second plastic melt is accomplished using the distributing tool which also opens into the second melt-flow duct;

wherein the first melt-flow duct is routed around the distributing tool using the branch;

wherein a) the second melt-flow duct conveying the first plastic melt and the deposited second plastic melt and b) the melt-flow ducts conveying the first plastic melt are merged in the profiling nozzle so that the first plastic melt from the first melt-flow duct is merged onto the second plastic melt from the second melt flow duct.

4. The extrusion die according to claim 1, wherein the distributing tool is an adjustable, multi-piece slide adapter or an adjustable multiple-leaf adapter.

5. The extrusion die according to claim 1, wherein, in an outlet region, the profiling nozzle has a profile complementary to a web plate with a) a top flange, b) a bottom flange, c) optionally an intermediate flange and d) vertical webs or diagonal webs disposed between the flanges.

6. The extrusion die according to claim 1, having a multi-piece construction; and wherein a portion, in which the first melt-flow duct is routed around the second melt flow duct or the distributing tool using a branch and is merged again downstream from the branch, is disposed in a one-piece exchangeable adapter or a multi-piece exchangeable adapter.

7. A process for making a hollow-chamber profiled panel, comprising:

coextruding a first plastic melt and a second plastic melt using the extrusion die according to claim 1;

wherein said second plastic melt is deposited onto said first plastic melt upstream from or in the region of the branch, thereby obtaining a deposited second plastic melt;

wherein a distribution of the deposited second plastic melt is regulated using the distributing tool;

wherein said second melt-flow duct conveying the first plastic melt and the deposited second plastic melt is then merged with the first melt-flow duct in the profiling nozzle, whereupon the first plastic melt from the first melt-flow duct is deposited on the second plastic melt from the second melt flow duct, to sandwich the second plastic melt between two layers of the first plastic melt, thereby obtaining united plastic melts; and wherein the united plastic melts are shaped to said hollow-chamber profiled panel during ejection from the profiling nozzle;

wherein said hollow-chamber profiled panel is made of a thermoplastic plastic with a layered structure which comprises a top layer and a bottom layer of the first plastic melt; and an intermediate layer of the second plastic melt disposed in an interior of a hollow chamber profile.

8. The method according to claim 7, further comprising sizing said hollow-chamber profiled panel.

9. The method according to claim 7, further comprising providing a web plate with a) a top flange, b) a bottom flange, c) optionally an intermediate flange and d) vertical diagonal webs or diagonal webs disposed between the flanges.

10. The method according to claim 9, wherein said web plate is a double-web plate, a multiple-web plate or a truss plate.

11. A hollow-chamber profiled panel obtained by the method according to claim 7 comprising a web plate with a top flange, a bottom flange and interposed webs, and wherein the flanges and the interposed webs are made substantially of the plastic of the first plastic melt; and wherein a continuous interior flange layer of the plastic of the second plastic melt, seated on the inside of one of the top or bottom layers of the face sheets of the webs, is present, wherein said panel is obtained from a thermoplastic plastic with a layered structure which comprises a top layer of the first plastic melt and a bottom layer of the first plastic melt and a continuous layer of the second plastic melt disposed in the interior of the hollow-chamber profile.

12. The hollow-chamber profiled panel according to claim 11, wherein said web plate is a double-web plate, a multiple-web plate or a truss plate.

13. The hollow-chamber profiled panel according to claim 11, wherein the flanges have a thickness of 0.5 to 4 mm;

wherein the continuous interior flange layer has a thickness of 10 to 250 $\mu$m; and wherein a total thickness of the web plate ranges between 8 and 40 mm.

14. The hollow-chamber profiled panel according to claim 11, wherein the continuous interior flange layer is made of a thermoplastic plastic which contains an inorganic or organic pigment, a coloring agent, a pearlescent pigment and/or an impact modifier and/or light-scattering beads and/or a light-scattering agent.

15. The hollow-chamber profiled panel according to claim 14, which contains an IR-reflecting pearlescent pigment.

16. The hollow-chamber profiled panel according to claim 11, which is made of polymethyl methacrylate plastic.

17. A roofing panel or a cladding panel, comprising:

the hollow-chamber profiled panel according to claim 11.

* * * * *